(12) United States Patent
Park et al.

(10) Patent No.: US 10,710,316 B2
(45) Date of Patent: Jul. 14, 2020

(54) VACUUM KNIFE TOOL

(71) Applicant: NIKE, Inc., Beaverton, OR (US)

(72) Inventors: Dae Young Park, Gimhae-si (KR); JiHoo Park, Seoul (KR); Jong Keun Lee, Gimhae-si (KR); John J. Park, Gimhae-si (KR); Seung Jo Myung, Seoul (KR)

(73) Assignee: NIKE, INC., Beaverton, OR (US)

( * ) Notice: Subject to any disclaimer, the term of this patent is extended or adjusted under 35 U.S.C. 154(b) by 0 days.

(21) Appl. No.: 16/512,010

(22) Filed: Jul. 15, 2019

(65) Prior Publication Data

US 2019/0337238 A1    Nov. 7, 2019

Related U.S. Application Data

(63) Continuation of application No. 15/439,508, filed on Feb. 22, 2017, now Pat. No. 10,350,831.

(Continued)

(51) Int. Cl.
*B29C 65/00* (2006.01)
*B26D 7/00* (2006.01)
(Continued)

(52) U.S. Cl.
CPC .......... *B29C 65/7847* (2013.01); *B26D 7/018* (2013.01); *B26D 7/14* (2013.01);
(Continued)

(58) Field of Classification Search
CPC ......... B29C 65/00; B29C 65/70; B29C 65/78; B29C 65/784; B29C 65/7847;
(Continued)

(56) References Cited

U.S. PATENT DOCUMENTS 4,832,773 A    5/1989   Shaposka et al.
4,932,883 A    6/1990   Hsia et al.
(Continued)

FOREIGN PATENT DOCUMENTS

CN    104723394 A    6/2015
JP    H03219940 A    9/1991
(Continued)

OTHER PUBLICATIONS

Communication pursuant to Article 94(3) dated Sep. 30, 2019 in European Patent Application No. 17712271.0, 9 pages.

*Primary Examiner* — Jacob T Minskey
*Assistant Examiner* — Matthew Hoover
(74) *Attorney, Agent, or Firm* — Shook, Hardy & Bacon, LLP (57) ABSTRACT

Cutting of a material, such as a textile or film, can damage the material. A tool is provided that utilizes vacuum pressure near a knife edge to increase a result of the cut. The vacuum pressure passes through a base portion of the tool that has a recessed portion effective to distribute vacuum pressure to one or more apertures extending around an insert of a core portion. The one or more apertures align with a void between the knife edge and the insert allowing for the void to transmit the vacuum pressure through the tool to the knife edge. A machine horn may then cut the material at the knife edge and couple the material with another material.

17 Claims, 7 Drawing Sheets

Related U.S. Application Data (60) Provisional application No. 62/299,238, filed on Feb. 24, 2016.

(51) Int. Cl.

| | | |
|---|---|---|
| *B26F 1/00* | (2006.01) | |
| *B29C 65/78* | (2006.01) | |
| *B26D 7/01* | (2006.01) | |
| *B26D 7/14* | (2006.01) | |
| *B26F 1/44* | (2006.01) | |
| *B29C 65/48* | (2006.01) | |
| *B29C 65/50* | (2006.01) | |
| *B29C 65/08* | (2006.01) | |
| *B29C 65/74* | (2006.01) | |
| *B29L 31/50* | (2006.01) | |

(52) U.S. Cl.
CPC ............... *B26F 1/44* (2013.01); *B29C 65/08* (2013.01); *B29C 65/4815* (2013.01); *B29C 65/5057* (2013.01); *B29C 65/7457* (2013.01); *B29C 66/1122* (2013.01); *B29C 66/4724* (2013.01); *B29C 66/729* (2013.01); *B29C 66/8322* (2013.01); *B26F 2001/4481* (2013.01); *B26F 2210/16* (2013.01); *B29L 2031/505* (2013.01)

(58) Field of Classification Search
CPC ......... B29C 65/08; B29C 65/40; B29C 65/48; B29C 65/481; B29C 65/4815; B29C 65/50; B29C 65/505; B29C 65/5057; B29C 65/74; B29C 65/745; B29C 66/10; B29C 66/11; B29C 66/112; B29C 66/1122; B29C 66/40; B29C 66/47; B29C 66/472; B29C 66/4724; B29C 66/70; B29C 66/72; B29C 66/729; B29C 66/80; B29C 66/83; B29C 66/832; B29C 66/8322; B26D 7/00; B26D 7/01; B26D 7/018; B26D 7/10; B26D 7/14; B26F 1/00; B26F 1/40; B26F 1/44; B26C 66/00

See application file for complete search history.

(56) References Cited

U.S. PATENT DOCUMENTS

| | | | |
|---|---|---|---|
| 5,061,331 A | 10/1991 | Gute | |
| 2004/0149115 A1* | 8/2004 | Ide | B26D 7/018 83/862 |
| 2013/0127193 A1* | 5/2013 | Regan | B25J 15/0691 294/188 |

FOREIGN PATENT DOCUMENTS

| | | |
|---|---|---|
| JP | 2000-153230 A | 6/2000 |
| KR | 10-1560124 B1 | 10/2015 |
| TW | 200416704 A | 9/2004 |
| WO | 2013074928 A1 | 5/2013 |

\* cited by examiner

VACUUM KNIFE TOOL

CROSS-REFERENCE TO RELATED APPLICATIONS

This application having and entitled "Vacuum Knife Tool" is a continuation of, and claims priority to co-pending U.S. Nonprovisional application Ser. No. 15/439,508, filed Feb. 22, 2017, and entitled "Vacuum Knife Tool," which claims the benefit of U.S. Provisional Application No. 62/299,238, entitled "Vacuum Knife Tool," and filed Feb. 24, 2016. The entireties of the aforementioned applications are incorporated by reference herein.

TECHNICAL FIELD

Aspects provide methods and systems for cutting a material with a vacuum-assisted tool.

BACKGROUND

Cutting of material for joining with other materials is commonly performed in the manufacturing of articles, such as footwear and apparel. However, the cutting of a material may damage the material, such as if there are graphical elements applied to a surface contacted by a cutting surface. Further, when coupling the cut material with another material, several defects may be introduced in the bonding processes. For example, the cut material may dimensionally curve as a result of the cutting process, air may be trapped between the cut material and the material to be bonded, and the cut material may come out of alignment while being bonded with the other material.

BRIEF SUMMARY

Aspects hereof provide systems and methods for cutting a material for coupling with another material in a manner that reduces defects, deformations, and other undesired results. For example, during the construction of an article of footwear or apparel, a first material may be coupled (e.g., bonded) with a second material to provide functional and/or aesthetic enhancements to the second material. An example includes application of a decal or logo that is cut from a first material and bonded to a second material. Traditional tooling can cause peeling of paint at a cut edge of the first material, a curling (e.g., concave or convex curvature) of the first and/or second materials once coupled, and defects in the bonding as a result of trapped air between the first material and the second material. As such the systems and methods provided allow for improved cutting of a first material by using a vacuum-assisted cutting tool having a structure that allows for the integral use of vacuum pressure. This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Aspects hereof provide systems and methods for cutting a material for coupling with another material in a manner that reduces defects, deformations, and other undesired results. For example, during the construction of an article of footwear or apparel, a first material may be coupled (e.g., bonded) with a second material to provide functional and/or aesthetic enhancements to the second material. An example includes application of a decal or logo that is cut from a first material and bonded to a second material. Traditional tooling can cause peeling of paint at a cut edge of the first material, a curling (e.g., concave or convex curvature) of the first and/or second materials once coupled, and defects in the bonding as a result of trapped air between the first material and the second material. As such the systems and methods provided allow for improved cutting of a first material by using a vacuum-assisted cutting tool having a structure that allows for the integral use of vacuum pressure.

In a first aspect, a vacuum-assisted cutting tool is provided that includes a core portion and a knife portion. The core portion comprises a core flange having a top surface and an opposite bottom surface. Further, the core portion includes one or more core flange apertures that extend through the core flange. Additionally, the core portion includes an insert that extends from the core flange top surface to a top surface of the insert. The knife portion includes a knife flange and a knife edge. The knife edge forms a cutting perimeter of the knife portion. Further, the knife portion includes an insert aperture that extends through the knife portion from the knife flange bottom surface to the knife edge such that the knife edge defines the insert aperture opening. The insert aperture is configured to receive the core portion insert and allow for fluid transmission of vacuum pressure from the knife edge through the insert aperture and through the one or more core flange apertures.

Another aspect provides for a vacuum-assisted cutting tool as integrated with a welding system for the cutting and coupling of the first and second materials. For example, the vacuum-assisted cutting tool is similarly comprised of a core portion having one or more core flange apertures extending through a core flange and also having an insert extending from the core flange to a top surface of the insert. The vacuum-assisted cutting tool is also comprised of a knife portion having a knife edge extending around and beyond the core portion insert such that the knife edge is spaced apart from the core portion inserts to allow for fluid transmission between the knife portion and the core portion. The system is further comprised of a vacuum source that is fluidly coupled with the vacuum-assisted cutting tool. Additionally, the system is comprised of a welding horn that is positioned and sized to be received within the knife portion at the insert top surface.

Methods are provided for using a vacuum-assisted cutting tool to cut and secure a first material with a second material. In an exemplary method the first material is positioned over a vacuum-assisted cutting tool. For example the first material may include a collection of graphics (e.g., logos) with a specific graphic to be removed from the collection by the vacuum-assisted cutting tool. In this method, the vacuum-assisted cutting tool is comprised of a knife edge surrounding a recessed insert, such as provided above. The method continues with applying vacuum pressure to the first material at the knife edge such that the vacuum pressure passes between the knife edge and the insert at the first material. The vacuum pressure is effective to evacuate air between the first material and the insert top surface and to secure the first material in an appropriate position for subsequent processes. The method continues with cutting the first material at the knife edge, such as having a horn press the first material from the knife edge toward the recessed insert. The method may also continue with positioning a second material over the first material maintained between the knife edge and supported by the insert and compressing the second material and the first material between the horn and the insert. This compression may be combined with an ultrasonic vibration communicated through the horn to cause a welding between the first material and the second material, in an exemplary aspect.

Additional systems, configurations, and methods will be provided herein to further develop and expand an understanding of a vacuum-assisted cutting tool.

Figure 1:
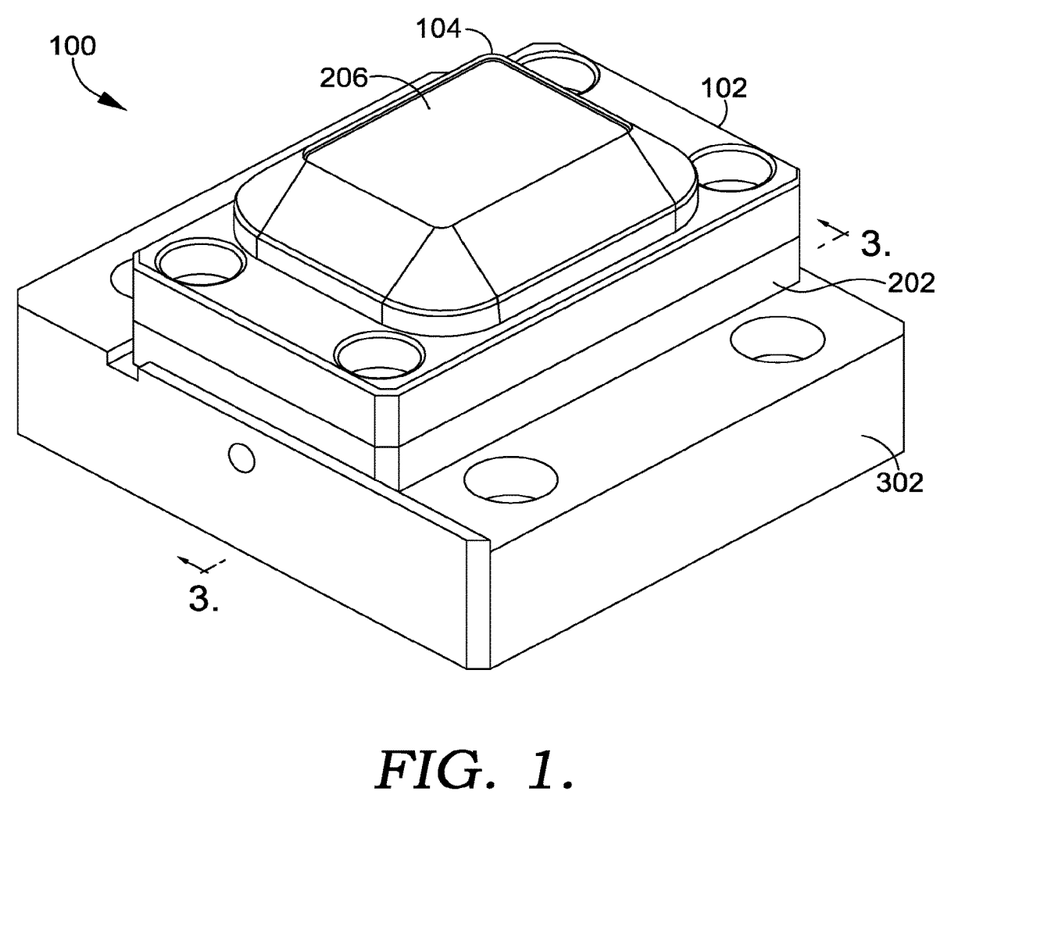
FIG. 1 depicts a vacuum-assisted cutting tool, in accordance with aspects hereof.

FIG. 1 depicts a vacuum-assisted cutting tool 100, in accordance with aspects hereof. The "vacuum-assisted cutting tool 100" is also referred to as "tool 100" hereinafter for convenience. The tool 100 is comprised of a knife portion 102, a core portion 202, and a base portion 302, in an exemplary aspect. However, it is contemplated that the base portion 302 may be omitted in exemplary aspects, such as when the insert portion is directly secured to a manufacturing machine, such as an ultrasonic welding machine, where a portion of the machine serves as the base portion. Additionally, while a specific configuration (e.g., size, shape, orientation) is illustrated herein, it is intended to be illustrative in nature and not limiting as to a scope of coverage. For example, a rectangular shape is formed by a knife edge 104; however, any shape may be formed, such as a shape representing a logo, decal, or other design. Similarly, as will be provided hereinafter, other dimensions may also be modified, such as a recesses of an insert 206 top surface from the knife edge 104. This recess may be changed depending on a thickness of a first material to be cut by knife edge 104 to ensure a sufficient through cut while still providing sufficient compression between the first material and the second material overlaid to achieve a coupling by ultrasonic welding or other means.

Figure 2:
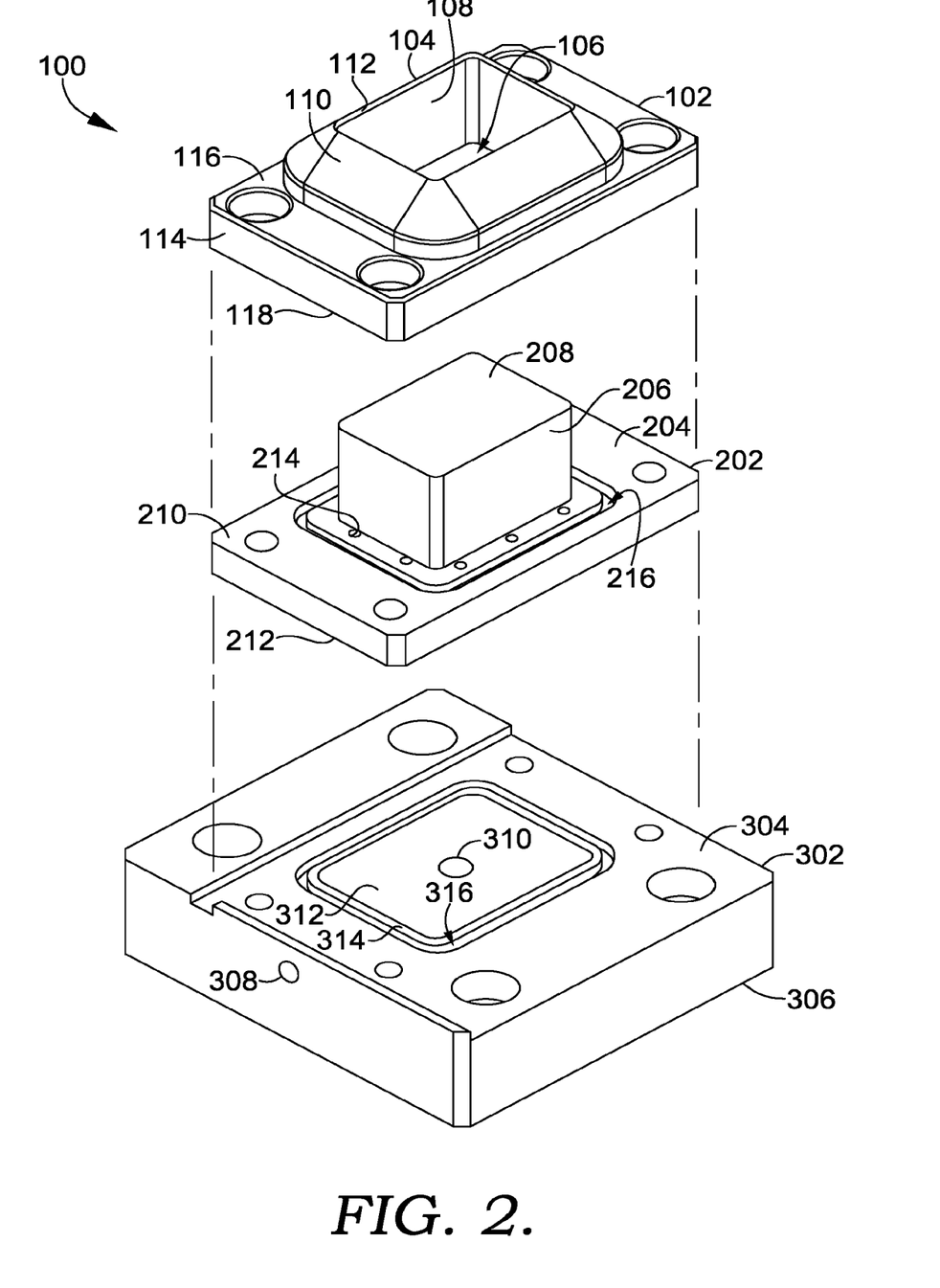
FIG. 2 depicts an exploded view of the tool from FIG. 1, in accordance with aspects hereof.

FIG. 2 depicts an exploded view of the tool 100, in accordance with aspects hereof. The knife portion 102 is comprised of a knife flange 114 having a top surface 116 and an opposite bottom surface 118. Further, the knife edge 104, which extends above the knife flange 114, is formed from an outer surface 110 projecting from the knife flange top surface 116 and from an inner knife surface 112 that is angularly extending from an insert aperture surface 108. As will be discussed in connection with FIG. 6, one or more angular options may be implemented to achieve a desired result. The knife edge 104 defines, at least in part, an insert aperture 106 extending through the knife portion 102 from the bottom surface 118 to the knife edge 104. As will be demonstrated herein, the insert aperture 106 allows for an insert 206 of the core portion 202 to extend through at least a portion of the knife portion 102.

The core portion 202 is comprised of a core flange 204 having a top surface 210 and an opposite bottom surface 212. The core flange 204 is also comprised of one or more core flange apertures 214 extending through the core flange 204 from the top surface 210 to the bottom surface 212. The core flange apertures 214 provide a conduit for passing vacuum pressure through the core flange 204 to a space between the insert 206 and the insert aperture surface 108. The core portion 202 is also comprised of the insert 206 that extends from the core flange top surface 210 to a top surface 208. The insert 206 is configured to pass through the insert aperture 106 and to be recessed below the knife edge 104. The top surface 208 may serve as a supporting surface to a machine horn (e.g., an ultrasonic welding horn) that compresses one or more materials, such as for coupling the materials together. In an exemplary aspect, the top surface 208 is a solid, non-porous, surface, which allows for a vacuum seal with the first material and limits surface defects formed during a compression of the first material. The core portion 202 is also comprised of a seal channel 216 configured to hold a seal, such as an O-ring or a gasket.

The base portion 302 is comprised of a top surface 304 and an opposite bottom surface 306. The base portion 302 also includes a recessed portion 312 of the top surface 304. The recessed portion 312 may be defined by a lip 314 and/or a seal channel 316. The recessed portion 312 allows for fluid connectivity between a vacuum port 310 and the one or more core flange apertures 214. The vacuum port 310 is fluidly coupled through the base portion 302 with a connection port 308. A vacuum pressure source may be fluidly coupled (e.g., connected by hose or tubing) with the base portion 302 such that vacuum pressure is transmitted though the vacuum port 310, across the recessed portion 312, through the one or more core flange apertures 214, and between the insert 206 and the insert aperture surface(s) 108 to the knife edge 104 for evacuating air between the first material and the insert top surface 208, in an exemplary aspect that will be illustrated in the following figures.

The tool 100 provides for a cutting edge at the knife edge 104 such that when a horn, such as an ultrasonic welding horn, compresses the first material between the horn end and the knife edge 104, the first material is cut to the shape provided by the knife edge 104. The cut portion of the first material is maintained on the top surface 208 of the insert 206 by the vacuum pressure communicated through the tool 100. This vacuum pressure removes air that may be trapped between the first material and the insert 206 that can cause deformities when bonding the first material with a second material. Similarly, the vacuum pressure prevents the first material from convexing away (e.g., outward bow) from the insert top surface 208, which may occur with the configuration of the knife edge 104 without the vacuum pressure. This convexing away can lead to irregularities when positioning the second material on the first material for coupling. The positioning of vacuum pressure near the knife edge, as opposed to a central location of the insert, allows for fewer defects, in an exemplary aspect, to the first material when being bonded to the second material as the vacuum pressure is proximate the edges as opposed to a central region of the first material.

The knife portion 102, the core portion 202, and the base portion 302 may be fixedly coupled together in an exemplary aspect. For example, the insert 206 may remain in a fixed, non-moveable, position relative to the knife edge 104. This fixed positioning provides a secure and robust top surface 208 about which an ultrasonic weld may occur. Therefore, as a different recessed height is chosen for different material thicknesses (e.g., different first materials), the core portion 202 may be changed from the tool 100 such that a different insert having a different height from the top surface 210 is implemented. The modular construction of the tool 100 allows for interchangeability, such as replacement of the knife portion 102 if the knife edge 104 becomes dull or the exchange of the core portion 202 if a different insert 206 is to be used. The various portions of the tool 100 may be secured with mechanical fasteners (e.g., bolts), welding, and the like. The portions may be formed from typical tool and/or die materials, such as steel, aluminum, and the like. For example, the knife portion 102 may be formed from a hardened allow tool steel to maintain a knife edge for a greater duration than a material used to form the core portion 202 and/or base portion 302, in an exemplary aspect.

Figure 3:
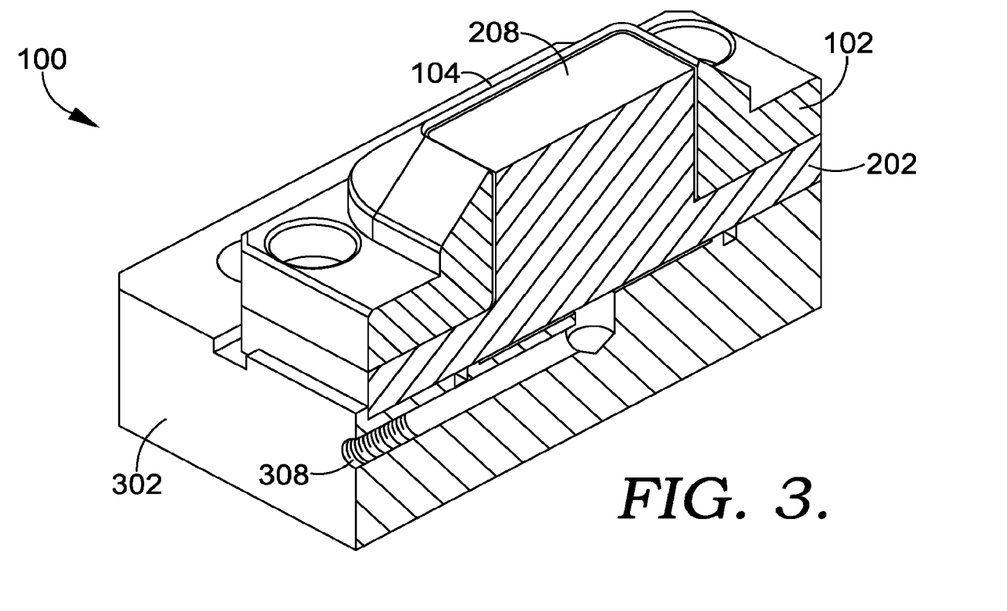
FIG. 3 depicts a perspective cross-section view of the tool of FIG. 1 along cut line 3-3, in accordance with aspects hereof.
Figure 4:
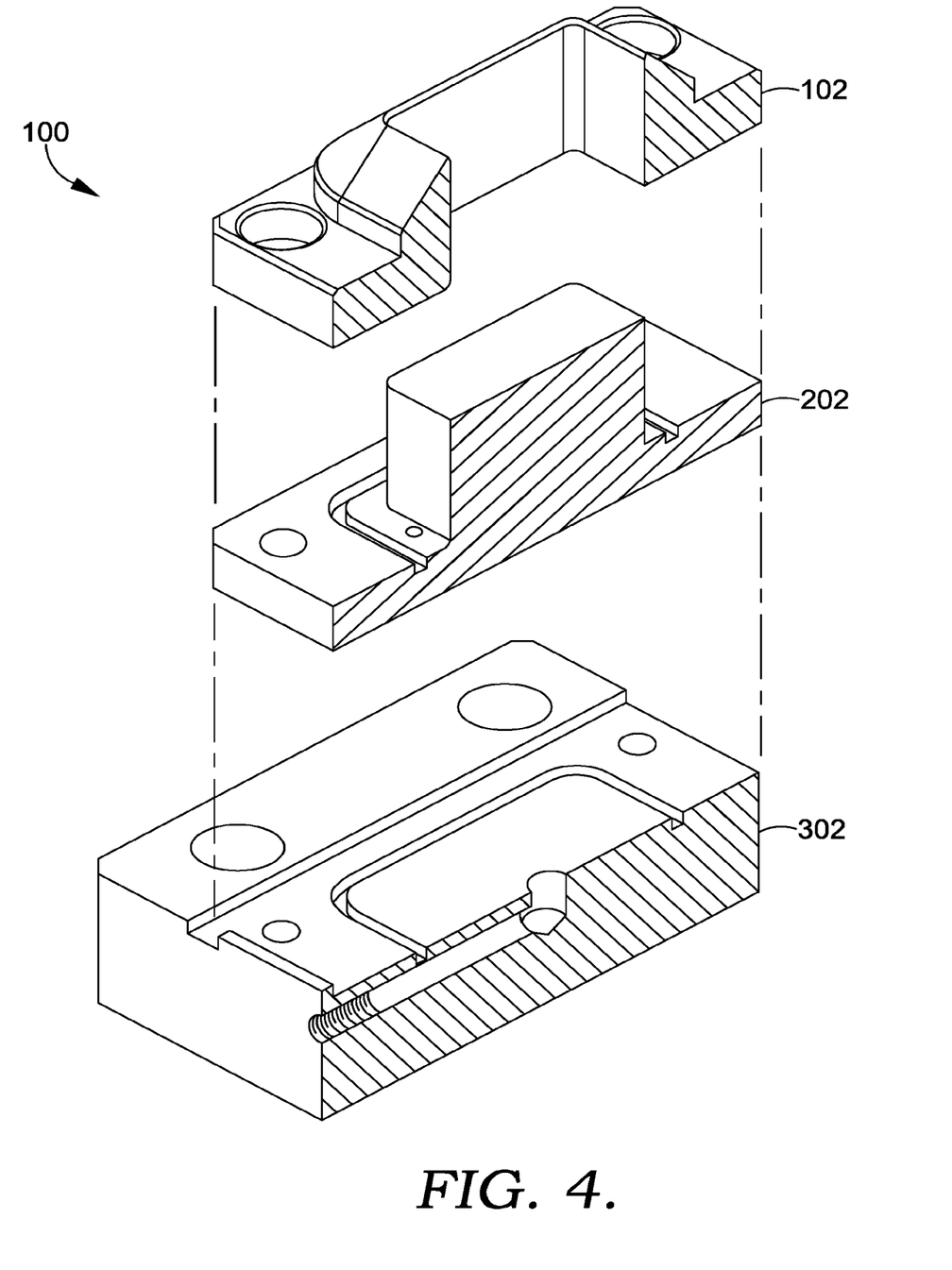
FIG. 4 depicts an exploded view of the cross-sectional view of FIG. 3, in accordance with aspects hereof.
Figure 5:
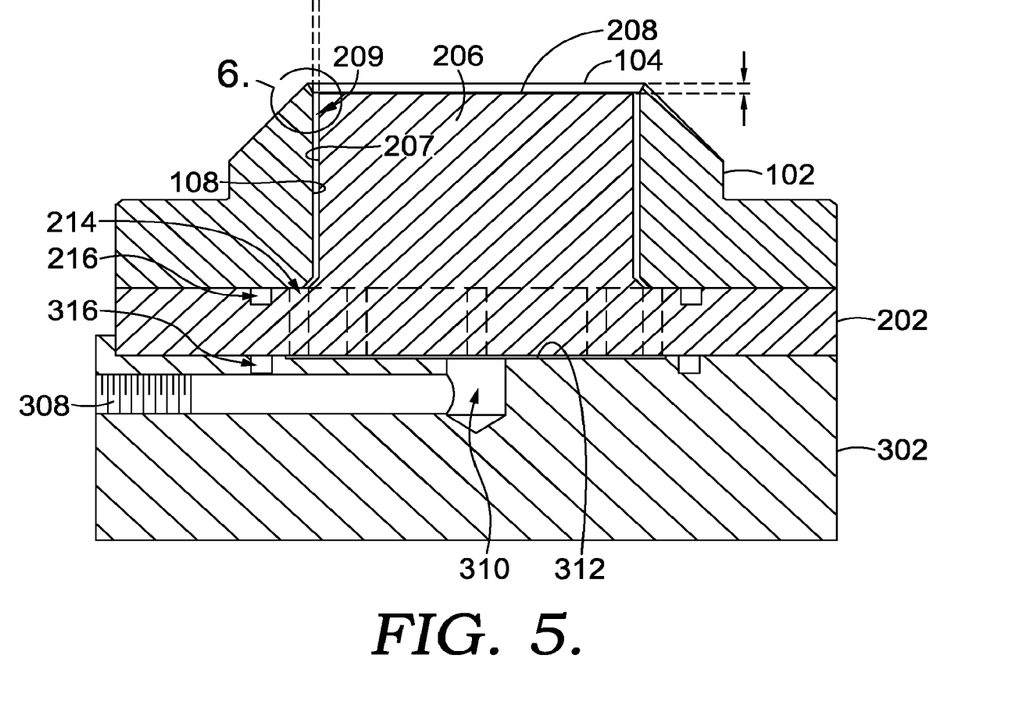
FIG. 5 depicts an elevation cross-sectional view of the tool from FIG. 1 along cut line 3-3, in accordance with aspects hereof.

FIG. 3 depicts a perspective cross section view of the tool 100 along cut line 3-3 of FIG. 1, in accordance with aspects hereof. A channel can be seen extending from the connection port 308 to the recessed portion of the base portion 302, as best seen in FIG. 5 hereinafter. An exploded view of the cross sectional view of FIG. 3 is depicted in FIG. 4.

FIG. 5 depicts an elevation cross-sectional view of the tool 100 along cut line 3-3 of FIG. 1, in accordance with aspects hereof. As illustrated, vacuum pressure can pass through the connection port 308 to the vacuum port 310. At the vacuum port 310, vacuum pressure is communicated to the one or more core flange apertures 214 by the recessed portion 312. The vacuum pressure is sealed by the seal channel 316 having a seal positioned therein (e.g., an O-ring). The vacuum pressure passes through the core portion 202 by way of the one or more core flange apertures 214. The vacuum pressure is then communicated through the knife portion between a surface 207 of the insert 206 and the insert aperture surface 108. The space between the knife portion 102 insert aperture and the insert 206 is labeled as space 209. The space 209 may be maintained constant around the insert 206 or it may be varied at any height or location. The space 209 may have an offset between the insert 206 and the insert aperture surface 108 between 0.01 millimeter (mm) and 2 mm, in an exemplary aspect. The space 209, stated differently, results from the insert aperture having a shape at the knife edge that corresponds with, but is greater (e.g., larger) than, the insert top surface 208. Also depicted is a recess height from the knife edge 104 and the insert top surface 208. The recess may have a distance between 0.01 mm and 10 mm, in an exemplary aspect. As discussed, the recessed may be increased for thicker materials and decreased for thinner materials. Similarly, the recess may be adjusted based on a compressibility of the material.

The one or more core flange apertures 214 are positioned around the perimeter of the insert 206 and within a distance of the space 209 to allow for the communication of vacuum pressure from the core portion 202 to the knife portion 102. The number of core flange apertures may be varied based on the shape of the insert aperture. For example, it is contemplated that at least one core flange aperture may be present for each major surface of the insert 206, in an exemplary aspect. The seal channel 216 inhibits unintended pressure loss between the core portion 202 and the knife portion 102.

Figure 6:
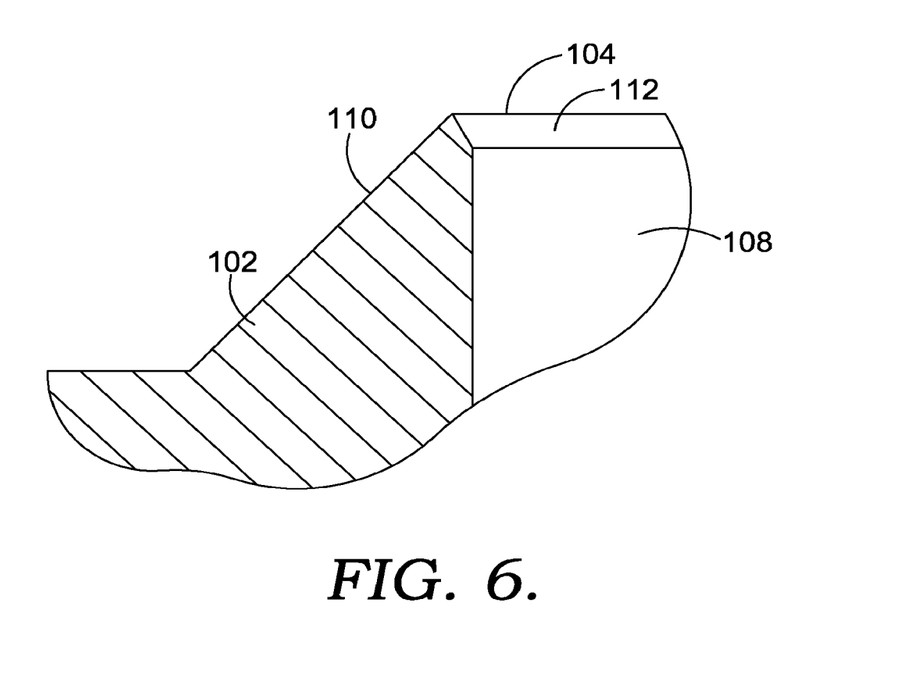
FIG. 6 depicts an enlarged view of the knife edge from area 6 of FIG. 5, in accordance with aspects hereof.

FIG. 6 depicts a detailed view of the knife edge 104 from area 6 of FIG. 5, in accordance with aspects hereof. The knife portion 102 forms the knife edge 104 from the intersection of the outer surface 110 and the inner knife surface 112, which forms a beveled knife edge. The inner knife surface 112 is angularly offset from the insert aperture surface 108, such that the knife edge 104 is offset from the space 209 formed, in part, by the insert aperture surface 108. This lateral offsetting allows the cut first material to engage with the space 209 to form a vacuum seal between the first material and the tool 100, in an exemplary aspect. Further, the beveled knife edge, in an exemplary aspect, results in less surface peeling of the first material than an edge formed from an intersection of the insert aperture surface 108 and the vertical outer surface 110.

Figure 7:
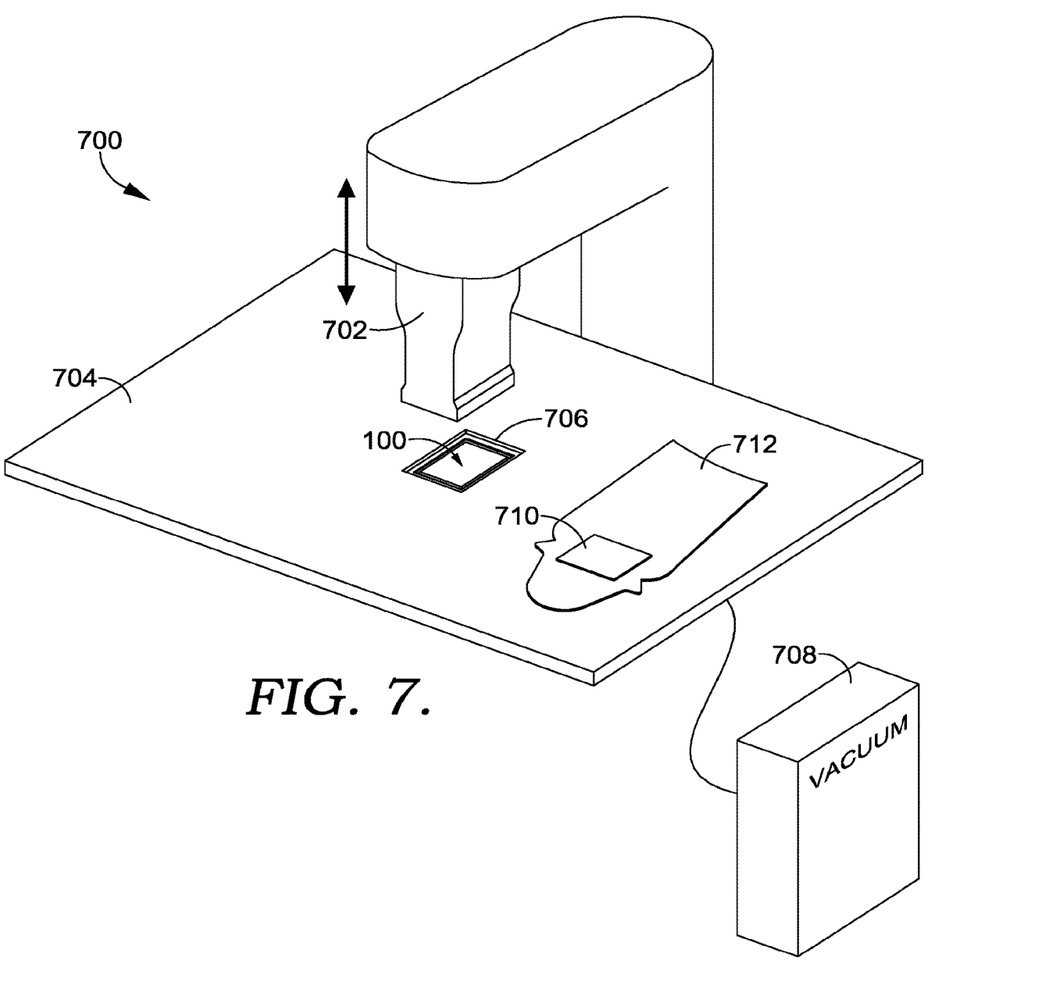
FIG. 7 depicts a vacuum-assisted cutting tool and welding system, in accordance with aspects hereof.

FIG. 7 depicts a vacuum-assisted cutting tool and welding system 700, in accordance with aspects hereof. The system includes a horn 702, a support surface 704, the tool 100 of FIGS. 1-6, a light 706, and a vacuum source 708. Additionally depicted for illustrative purposes is an exemplary first material 710 and an exemplary second material 712, in accordance with aspects hereof.

The horn 702 provides compressive force to the first material 710. In a first example, the horn 702 is effective to compress the first material 710 against the knife edge of the tool 100 to cut the first material 710 from a larger portion of material. In this operation, the horn 702 may move in at least the Z-axis (as depicted in FIG. 7) through hydraulic, pneumatic, or other mechanical means. The distal end of the horn 702 is sized to be received within the knife edge of the tool 100 or to be size to be received over and covering the knife edge of the tool 100. For example, the distal end of the horn 702 may be flat and configured to make contact with the knife edge of tool 100 at all locations of the knife edge to ensure a complete cut through the material. Therefore, a common horn 702 may be used for a variety of knife edge configurations. The second example includes a distal end of the horn 702 that is configured to be received within the perimeter of the knife edge of tool 100 to effectuate a shear-type of cutting, in an exemplary aspect.

The horn 702 is also contemplated to be coupled with an ultrasonic generator that allows the horn 702 to transmit the ultrasonic energy to the first material 710 and the second material 712 to cause an ultrasonic weld to be created between the two materials. For example, as will be discussed in FIG. 8 hereinafter, subsequent to the horn 702 applying a compressive force against the first material 710 to cut the first material 710 from a greater source of material, the second material 712 may be positioned over the tool 100 maintaining the first material 710 in the insert aperture against the insert top surface. The horn 702 may then apply compressive force against the layered first material 710 and second material 712 while transmitting ultrasonic energy to the layered material. The layered materials are supported by the top surface of the insert. This arrangement is effective to couple the two layers together.

Alternatively or additionally, it is contemplated that the horn 702 may be effective to conduct thermal energy to the layered material. For example, it is contemplated that a thermal-activated adhesive (e.g., polyurethane film) may be positioned between the first material 710 and the second material 712 that can be activated by the thermal energy provided by the horn 702 in this example. Further yet, it is contemplated that another bonding agent, such as an adhesive, may be provided between the first material 710 and the second material 712 such that a mere application of compressive force by the horn 702 ensures a bond there between.

The light 706 is contemplated as an alignment aid. For example, it is contemplated that the light 706 is effective to illuminate the knife edge from a backlighting perspective. For example, the light 706 is positioned below the support surface 704 such that when a material is positioned at the tool 100 on the support surface 704, the light 706 illuminates the material and the tool 100. This illumination allows for the visual alignment of the material as the light permeates through the material from the tool facing side to the horn 702 facing side of the material. As the light is obscured at the knife edge, the contrast change at the knife edge provides a visual indication through the material as to the location of the knife edge relative to the material. Therefore, if the material is intended to be cut at a particular location, an alignment may be achieved by the backlighting effect of the light 706. The light 706 may be any light source, such as a light emitting diode.

The vacuum source 708 is a vacuum generator. The vacuum may be generated though pneumatic effects (e.g., coanda, veturi) or through mechanical means. The vacuum source 708 is fluidly coupled with the tool 100, such as by hosing or tubing. The vacuum pressure may be coupled with a base portion of the tool as discussed previously. The vacuum source 708 may be intermittently operated or continuously operated.

The first material 710 may be any material, such as a textile, foam, leather, or film. For example, the first material 710 may be a knit or woven substrate onto which a graphic is printed, embossed, embroidered or the like. For example, the first material 710 may be a tag or other label, in an exemplary aspect. Further, the first material may be a label intended to be adhered to a portion of an article of footwear, such as a tongue element. However, additional articles and locations are within the scope provided herein and specific implementation are not limiting. The second material 712 may be any material, such as a textile, film, foam, leather, and the like. For example, the second material 712 may be a knit or woven material formed from a polymer-based material. In an exemplary aspect, the first material 710 and the second material 712 are materials responsive to ultrasonic welding to couple the materials together with use of the horn 702, in an exemplary aspect.

Figure 8:
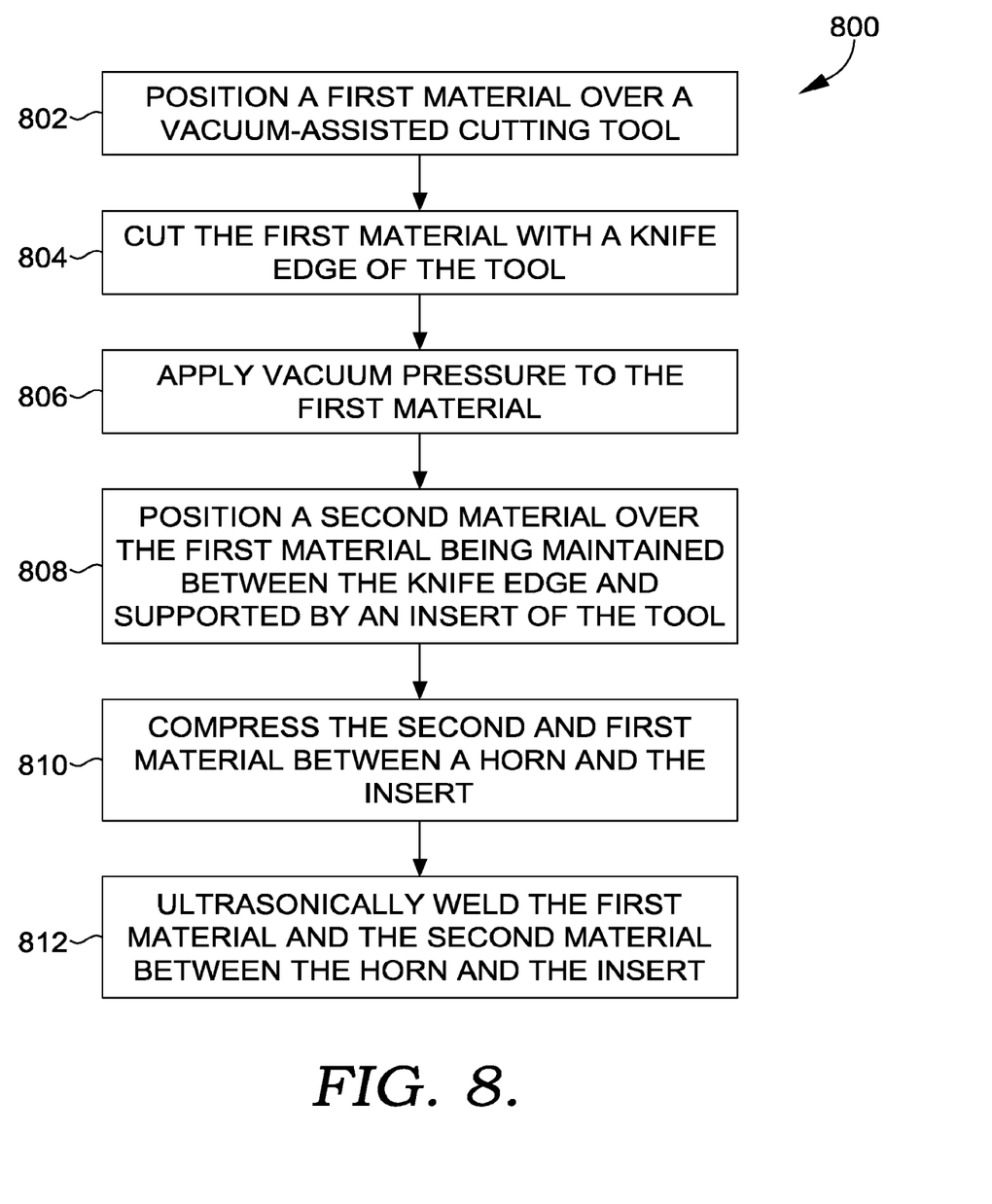
FIG. 8 depicts a flow diagram of a method of manufacturing with a vacuum-assisted cutting tool, in accordance with aspects hereof.

FIG. 8 depicts a flow diagram 800 of a method of manufacturing with a vacuum-assisted cutting tool, in accordance with aspects hereof. At a block 802, a first material is positioned over the vacuum-assisted cutting tool. For example, a material having a logo provided thereon may be positioned such that the logo is facing the vacuum-assisted cutting tool. This allows for the logo to be exposed once the first material is secured to a second material without having to reposition the first material in the tool. The positioning may be accomplished by activating a light source to backlight the material at the tool. As discussed above, the backlighting allows for a visual alignment of the material relative to the tool.

At a block 804, the first material is cut with a knife edge of the tool. For example, a horn may apply compressive force to the first material into the tool. As the force is applied, the knife edge cuts the first material from a larger material source. As previously provided, the horn may overlay the knife edge such that the horn is able to provide a compressive force to the first material at all (or substantially all) of the knife edge.

At a block 806, vacuum pressure is applied to the first material. The vacuum pressure is applied through the tool, as discussed with respect to FIGS. 1-5. This vacuum pressure increases the quality of the cut and maintains the material in the set position for cutting. The vacuum pressure may be continuously applied through the tool or as needed. For example, the vacuum pressure may be omitted while aligning the first material with the tool and then applied once the first material is cut. Alternatively, the vacuum pressure may be applied after aligning the first material, but before cutting the first material, in an exemplary aspect.

At a block 808, a second material is positioned over the first material as the first material is maintained between the knife edge and supported by an insert of the tool. The vacuum pressure pulls the cut first material into this position and removably holds the first material in this position. The light source may again be used to align the second material relative to the tool holding the first material. Additionally or alternatively, one or more visual and/or mechanical guides may be provided relative to the tool to aid in the alignment of the second material (and/or the first material).

At a block 810, the second material and first material are compressed between a horn and the tool, such as an insert of the tool. The compression may be accompanied by ultrasonic energy to cause an ultrasonic weld between the two materials, as provided in a block 812. Alternatively, as provided above, the compressive force may be used to set an adhesive or thermal energy may be applied to set a heat-activated adhesive.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A vacuum-assisted cutting tool, comprising:
 a core portion having one or more core flange apertures extending through a core flange, the core portion also having an insert extending from the core flange to a top surface of the insert; and
 a knife portion having a knife edge extending around and beyond the insert such that the knife edge is spaced apart from the insert to allow for fluid transmission between the knife portion and the core portion.

2. The vacuum-assisted cutting tool of claim 1, wherein the one or more core flange apertures are positioned on a top surface of the core portion at an intersection with an insert aperture of the knife portion.

3. The vacuum-assisted cutting tool of claim 1, wherein the insert has a height that is less than an insert aperture height, the height is between a top surface of the core flange and the top surface of the insert and the insert aperture height is between a bottom edge of a knife flange and the knife edge.

4. The vacuum-assisted cutting tool of claim 1, wherein a first insert surface extending between a top surface of the core flange and the top surface of the insert is spaced apart from a first surface of an insert aperture of the knife portion as the insert extends in the insert aperture.

5. The vacuum-assisted cutting tool of claim 1, wherein the top surface of the insert is a solid non-porous surface.

6. The vacuum-assisted cutting tool of claim 1, wherein the core portion further comprises a core seal, the core seal extending around at least one or more core flange apertures on a top surface of the core flange.

7. The vacuum-assisted cutting tool of claim 6, wherein the core seal extends around the insert.

8. The vacuum-assisted cutting tool of claim 7, wherein the core seal is an O-ring.

9. The vacuum-assisted cutting tool of claim 1, wherein the knife edge is formed from an intersection of a knife portion outer surface and a knife portion inner knife surface, the knife portion inner knife surface is angularly offset from an insert aperture surface.

10. The vacuum-assisted cutting tool of claim 9, wherein the knife portion inner knife surface is angularly offset from a plane perpendicular to a top surface of a knife flange of the knife portion.

11. The vacuum-assisted cutting tool of claim 1, wherein the top surface of the insert is recessed from the knife edge.

12. The vacuum-assisted cutting tool of claim 1, wherein an insert aperture of the knife portion has a shape at the knife edge that corresponds with, but is greater than, the top surface of the insert.

13. The vacuum-assisted cutting tool of claim 1 further comprising a base portion, the base portion having a base top surface opposite a base bottom surface, the base top surface coupled with a bottom surface of the core flange.

14. The vacuum-assisted cutting tool of claim 13, wherein the base portion is comprised of a vacuum port on the base top surface, the vacuum port extends through the base top surface at a recessed portion.

15. The vacuum-assisted cutting tool of claim 14, wherein the one or more core flange apertures at the bottom surface of the core flange are positioned at the recessed portion.

16. A vacuum-assisted cutting tool and welding system comprising:
  a vacuum-assisted cutting tool, comprising:
    a core portion, the core portion comprising:
      a core flange having a top surface and an opposite bottom surface;
      one or more core flange apertures extending through the core flange from the top surface to the bottom surface; and
      an insert, the insert extending from the core flange top surface to a top surface of the insert; and
    a knife portion, the knife portion comprising:
      a knife flange having a top surface and a bottom surface;
      a knife edge, the knife edge forming a cutting perimeter of the knife portion; and
      an insert aperture, the insert aperture extending through the knife portion from the knife flange bottom surface to the knife edge, wherein the insert aperture is configured to receive the insert and allow for fluid transmission of vacuum pressure from proximate the knife edge through the insert aperture and through the one or more core flange apertures;
  a vacuum source, the vacuum source fluidly coupled with the vacuum-assisted cutting tool; and
  a welding horn, wherein the welding horn is positioned and sized to be received within the knife portion at the top surface of the insert.

17. The vacuum-assisted cutting tool and welding system of claim 16 further comprising a light source, the light source positioned to emit light at the vacuum-assisted cutting tool from a plane equal to or below the knife edge.

* * * * *

UNITED STATES PATENT AND TRADEMARK OFFICE
CERTIFICATE OF CORRECTION

PATENT NO. : 10,710,316 B2
APPLICATION NO. : 16/512010
DATED : July 14, 2020
INVENTOR(S) : Dae Young Park et al.

Page 1 of 1

It is certified that error appears in the above-identified patent and that said Letters Patent is hereby corrected as shown below:

In the Specification

Column 1, Line 6, After "application" delete "having and".
Column 7, Line 14, Delete "though" and insert -- through --.
Column 7, Line 15, Delete "veturi)" and insert -- venturi) --.

Signed and Sealed this
Sixth Day of October, 2020

Andrei Iancu
*Director of the United States Patent and Trademark Office*